(12) United States Patent
Birkholz et al.

(10) Patent No.: US 8,388,023 B2
(45) Date of Patent: Mar. 5, 2013

(54) LIFTING DEVICE

(75) Inventors: Holger Birkholz, Faulbach (DE);
Konrad Lazarus, Freudenberg (DE);
Robert Miltenberger, Miltenberg (DE);
Ralf Natterer, Mömlingen (DE)

(73) Assignee: Haacon Hebetechnik GmbH, Freudenberg (DE)

( * ) Notice: Subject to any disclaimer, the term of this patent is extended or adjusted under 35 U.S.C. 154(b) by 344 days.

(21) Appl. No.: 12/375,749

(22) PCT Filed: Jul. 12, 2007

(86) PCT No.: PCT/DE2007/001257
§ 371 (c)(1),
(2), (4) Date: Jan. 30, 2009

(87) PCT Pub. No.: WO2008/014749
PCT Pub. Date: Feb. 7, 2008

(65) Prior Publication Data
US 2009/0250902 A1    Oct. 8, 2009

(30) Foreign Application Priority Data
Jul. 31, 2006 (DE) .......................... 10 2006 035 917

(51) Int. Cl.
*B60S 9/02* (2006.01)
(52) U.S. Cl. ...................... 280/763.1; 254/418; 254/424; 254/425
(58) Field of Classification Search ............... 280/425.1, 280/475, 5.3, 43.2, 763.1; 254/418, 419, 254/424, 425; 411/101, 108, 349, 418, 419, 411/424, 425; 74/89.39
See application file for complete search history.

(56) References Cited

U.S. PATENT DOCUMENTS 3,214,159 A * 10/1965 Roy ............................... 269/189
3,338,554 A *  8/1967 Gostomski .................... 254/103
(Continued)

FOREIGN PATENT DOCUMENTS

DE        3119359 A1    12/1982
DE        3604097 A1     8/1987
(Continued)

OTHER PUBLICATIONS

"PCT International Search Report dated Dec. 7, 2007 for PCT/DE2007/001257, from which the instant application is based," 2 pgs.
(Continued)

*Primary Examiner* — Tony H. Winner
*Assistant Examiner* — Daniel Yeagley
(74) *Attorney, Agent, or Firm* — Fredrikson & Byron, P.A.

(57) ABSTRACT

The invention relates to a lifting device (10), in particular a semitrailer support or the like, comprising a shank tube (11) and a support tube (12) which is movable with respect to the shank tube, wherein on the shank tube, a lifting gear mechanism (26) is arranged which comprises an input shaft arrangement (27) for connecting a drive device and an output shaft arrangement (28) for driving a lifting spindle (20) which is arranged within the support tube and which rests with one end on a pressure plate (18) arranged within the shank tube and interacts with the moving end with a spindle nut (25) arranged in the support tube, wherein the spindle nut comprises a locking collar (90) with at least two locking devices (107, 108, 109, 110) which interact with locking latches (103, 104, 105, 106) formed on the tube wall of the support tube in such a manner that, with a coaxial alignment of the spindle nut with the support tube, the spindle nut can be inserted, in an assembly rotational angle position, into the support tube, and can be moved by rotating about a longitudinal axis (21) of the support tube into a locking position, in which the locking devices get into engagement with the locking latches.

6 Claims, 2 Drawing Sheets

U.S. PATENT DOCUMENTS

| | | | |
|---|---|---|---|
| 3,421,778 A * | 1/1969 | Fleck et al. | 280/476.1 |
| 4,531,870 A * | 7/1985 | Moryl et al. | 411/108 |
| 5,435,523 A | 7/1995 | Hying et al. | |
| 6,099,016 A | 8/2000 | Peveler | |
| 6,874,764 B2 * | 4/2005 | Drake, III | 254/420 |
| 6,926,261 B1 * | 8/2005 | Renshaw | 254/420 |
| 7,152,848 B2 * | 12/2006 | Pfleging et al. | 254/419 |
| 7,425,015 B1 * | 9/2008 | Schipman | 280/490.1 |
| 2003/0089898 A1 | 5/2003 | Straw | |
| 2003/0168648 A1 | 9/2003 | Alguera Gallego | |
| 2008/0197332 A1 * | 8/2008 | Siedel et al. | 254/424 |

FOREIGN PATENT DOCUMENTS

| | | |
|---|---|---|
| DE | 19616704 A1 | 10/1997 |
| DE | 19836635 A1 | 2/2000 |
| DE | 19839359 A1 | 3/2000 |
| DE | 19955998 A1 | 5/2001 |
| DE | 20305175 U1 | 9/2003 |
| DE | 102005034554 A1 | 2/2007 |
| EP | 0513973 A | 11/1992 |
| EP | 0688687 A1 | 12/1995 |
| EP | 0845396 A | 6/1998 |
| EP | 0972689 A | 1/2000 |
| EP | 1236630 A1 | 9/2002 |
| EP | 1350701 A | 10/2003 |
| EP | 1598304 A | 11/2005 |
| RU | 2220090 C1 | 12/2003 |

OTHER PUBLICATIONS

"PCT International Search Report dated Oct. 12, 2007 for PCT/DE2007/001246," 2 pgs.

"PCT International Search Report dated Dec. 4, 2007 for PCT/DE2007/001247," 2 pgs.

"PCT International Search Report dated Dec. 4, 2007 for PCT/DE2007/001248," 2 pgs.

\* cited by examiner

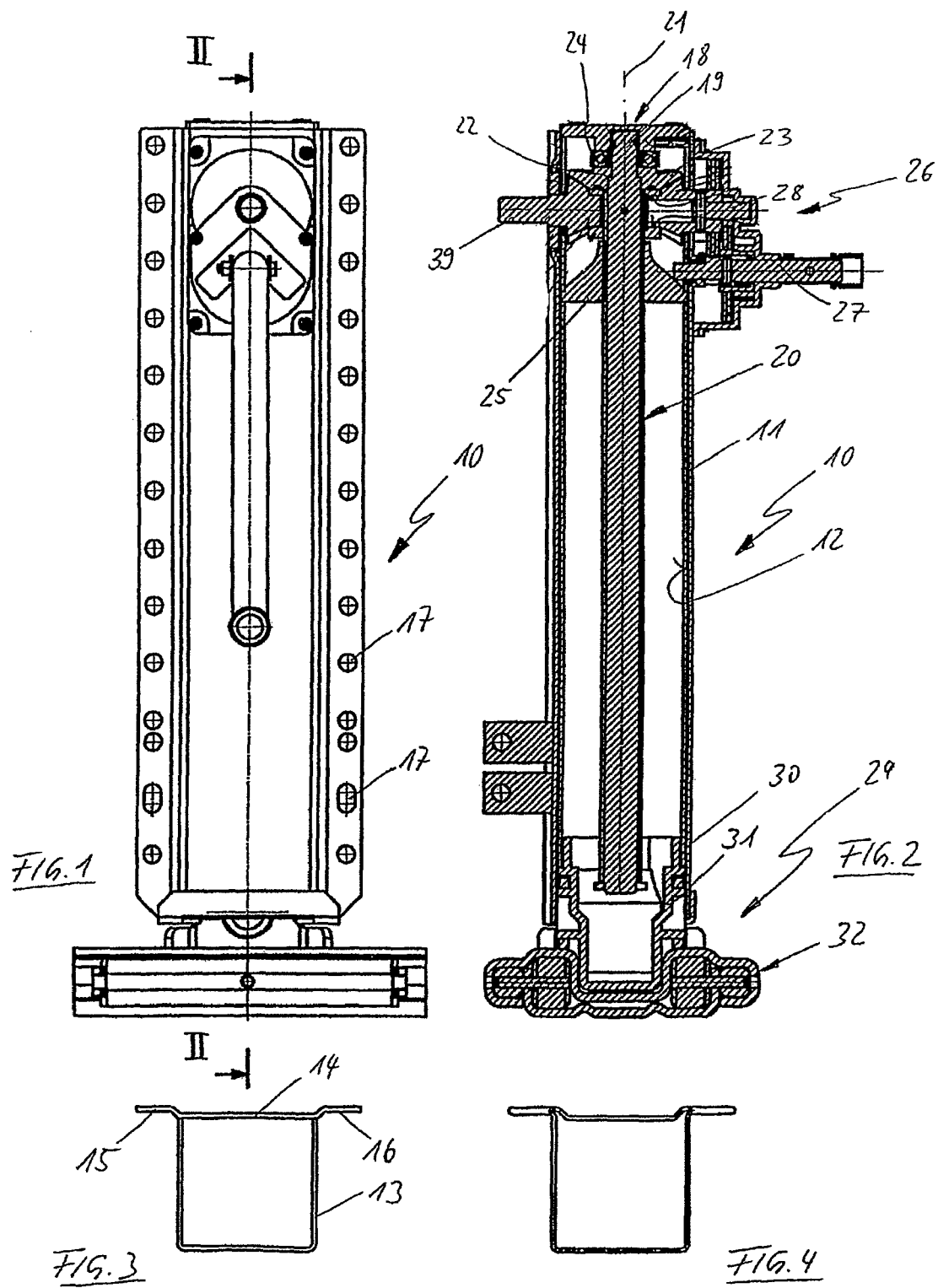

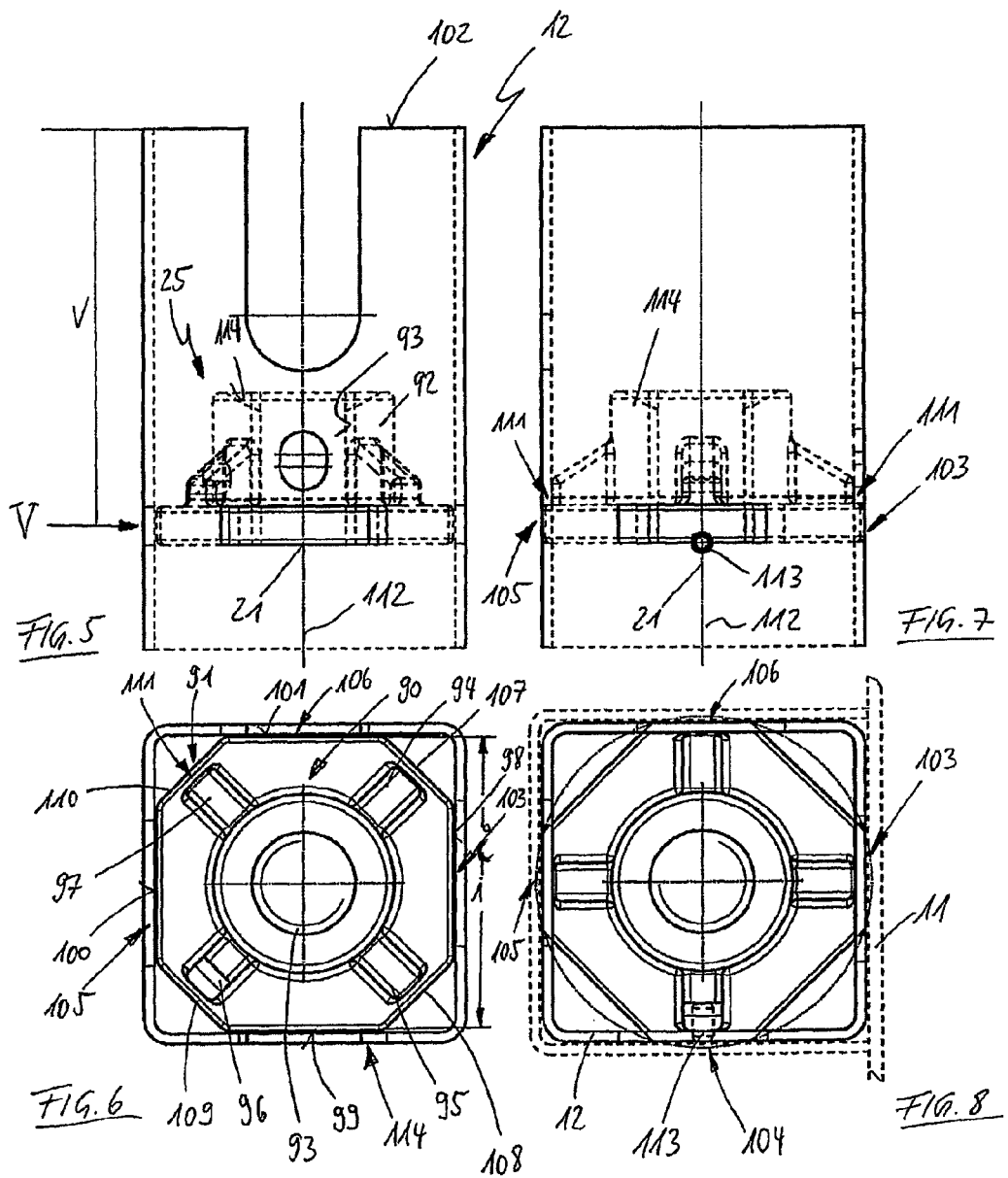

ations No. 10 2006 035 917.8 filed Jul. 31, 2006, the teachings

LIFTING DEVICE

RELATED APPLICATIONS

This application is a 35 U.S.C. 371 national stage filing from International Application No. PCT/DE2007/001257 filed Jul. 12, 2007, which claims priority to German Application No. 10 2006 035 917.8 filed Jul. 31, 2006, the teachings of which are incorporated herein by reference.

SUMMARY

The present invention relates to a lifting device, in particular a semitrailer support or the like, comprising a shank tube and a support tube which is movable with respect to the shank tube, wherein on the shank tube, a lifting gear mechanism is arranged which comprises an input shaft arrangement for connecting a drive device and an output shaft arrangement for driving a lifting spindle which is arranged within the support tube and which rests with one end on a pressure plate arranged within the shank tube and interacts with the moving end with a spindle nut arranged in the support tube.

Lifting devices of the type mentioned above are used in the application as semitrailer supports, for example, as height-adjustable support devices for so-called "semitrailers", when they are parked independently from a tractive vehicle. The force flow acting through the lifting spindle during the lifting operation, on the one hand, is transmitted into the shank tube through the pressure plate on which the lifting spindle rests with one end. The further interface within the force flow is formed towards the support tube between the moving end of the lifting spindle and the spindle nut. Since simultaneously with the force transmission, a relative movement of the lifting spindle within the spindle nut takes place, the spindle nut is exposed to specific mechanical loads which can require a replacement of the spindle nut. On the other hand, for a proper operation of the lifting device, it is, of course, essential that the mechanical connection of the spindle nut to the support tube is reliable and resists the high loads that occur. Furthermore, it is desirable that the manufacturing expenditure involved with the installation of the spindle nut at the support tube is as small as possible.

The present invention is hence based on the object to propose a lifting device which is designed in such a manner that the spindle nut, on the one hand, is arranged mechanically safe within the support tube, is easily replaceable, and, in addition, can be installed within the support tube with minor manufacturing expenditure.

In the lifting device according to the invention, the spindle nut is provided with a locking collar with at least two locking devices which interact with locking latches formed on the tube wall of the support tube in such a manner that, with a coaxial alignment of the spindle nut with the support tube, the spindle nut can be inserted, in an assembly rotational angle position, into the support tube and can be moved by rotating about the longitudinal axis of the support tube into a locking position, in which the locking devices get into engagement with the locking latches.

The lifting device designed according to the invention, due to an arrangement in which the locking devices and the tube wall of the support tube penetrate one another, ensures a particularly loadable connection between the spindle nut and the support tube. Moreover, the installation of the spindle nut at its location within the support tube can be carried out solely due to the locking effect, without the help of special tools or additional connection means, thus without mechanical connection means or the use of a joining technology, such as, for example, welding. In addition, this results in that a particularly easy replaceability of the spindle nut is ensured for the case that an early wear of the spindle nut is noticeable.

According to an advantageous embodiment, the locking collar comprises a circumferential contour with four guide rims which are each arranged opposing one another in pairs and which are spaced apart from one another corresponding to the inner dimension of the support tube formed as a square tube, and with four locking rims formed in the corner regions of the locking collar. In addition, the locking latches are formed by slotted recesses in opposing tube wall sections of the support tube.

The locking collar designed in such a manner, in spite of an extremely simply designed circumferential contour and of locking latches shaped in an extremely simple manner, acts as a reliable locking device for the spindle nut within the support tube.

When, in addition, the circumferential contour of the locking collar is formed as an octagon-contour, such that the locking rims are formed by flattened corners of the locking collar, the relative rotational movement of the spindle nut about the longitudinal axis of the support tube, necessary for generating the locking effect, is possible without the risk that the geometrical shape of the circumferential contour could have undercuts which could interfere with the locking movement. In fact, due to a contour formed in such a manner, an outer guidance of the locking movement in the contact area between the circumferential contour of the locking collar and the inner contour of the support tube is actually achieved.

A particularly simple realization of a spindle nut which combines the function of the spindle nut with a locking device is possible when, for formation of a nut thread, a threaded collar with an internal thread is arranged on the locking collar.

When, in addition, the threaded collar is provided on its outer circumference with four support ribs which are arranged opposing one another in pairs and which extend radially to the locking rims, the support ribs, on the one hand, allow a mechanical stabilization of the bond of the threaded collar around the locking collar. On the other hand, the support ribs serve for centering the spindle nut in its locking position within the support tube.

To be able to provide a lubricant reservoir directly in the region of the thread engagement between the lifting spindle and the spindle nut, it is advantageous when the threaded collar is provided with a trough-shaped recess on its upper rim.

Hereinafter, a preferred embodiment of the lifting device is explained in more detail with reference to the drawing.

BRIEF DESCRIPTION OF THE DRAWINGS

In the figures:
FIG. 1 shows a lifting device in a side view;
FIG. 2 shows the lifting device illustrated in FIG. 1 in a longitudinal section view along the section line II-II in FIG. 1;
FIG. 3 shows a shank tube of the lifting device illustrated in FIG. 1 in a cross sectional view;
FIG. 4 shows an alternative cross sectional form of the shank tube cross section illustrated in FIG. 3;
FIG. 5 shows an assembly rotational angle position of a spindle nut inserted into a support tube of the lifting device in a side view;
FIG. 6 shows the spindle nut illustrated in FIG. 5 in a top view;
FIG. 7 shows the spindle nut illustrated in FIG. 5 in the locking position in a side view;

FIG. 8 shows the spindle nut illustrated in FIG. 7 in a top view.

DETAILED DESCRIPTION

From an overview of FIG. 1 and FIG. 2, the structure of a lifting device 10 comprising a shank tube 11 and a support tube 12 coaxially arranged within the shank tube 11 is apparent. According to the embodiment illustrated in FIG. 3, the shank tube 11 consists of a U-shaped shank tube profile 13 and a mounting plate 14, which completes the profile 13 to form a square tube, and which forms at the same time the back wall of the shank tube 11. The mounting plate 14 serves for connection to a vehicle chassis and, on connection rails 15, 16 formed on the side, comprises a plurality of mounting bores 17 which allow a connection to differently formed vehicle chassis or in different mounting heights on a vehicle chassis, respectively.

As is apparent in particular from the sectional view illustrated in FIG. 2, the support tube 12 received in the shank tube 11 extends substantially over the entire length of the shank tube 11. As is further shown in FIG. 2, as a quasi front-end closure, the shank tube 11 comprises a pressure plate 18, which serves for receiving an upper lifting spindle end 19 of a lifting spindle 20 which extends on a longitudinal axis 21 of the lifting device 10 or the support tube 12, respectively. Furthermore, at the upper lifting spindle end 19, a lifting spindle gearwheel 23 is located, which is arranged torque-proof on a shaft collar 22, and which serves for driving the lifting spindle 20, and, together with the lifting spindle 20, rests against the pressure plate 18 via an axial bearing 24.

Arranged on the lifting spindle 20 is a spindle nut 25, which on its circumference is connected, in a rotationally fixed manner, with the support tube 12 so that a rotation of the lifting spindle 20 due to a driving of the lifting spindle gearwheel 23 via the thread engagement of the lifting spindle 20 with the spindle nut 25, depending on the direction of rotation, causes an extending or retracting of the support tube 12 out of or into the shank tube 11.

For driving the lifting spindle gearwheel 23 serves a lifting gear mechanism 26 which is arranged below the pressure plate 18, and which comprises an input shaft arrangement 27 and an output shaft arrangement 28 which acts on the lifting spindle gearwheel 23.

At the lower end of the support tube 12, a foot device 29 is located, which comprises a foot receptacle 31 connected with the lower front end 30 of the support tube 12, as well as a pivoting foot 32 connected with the foot receptacle 31.

As is apparent from an overview of FIGS. 5 and 6, which shows the spindle nut 25 inserted into the support tube 12 in the assembly rotational angle position, the spindle nut 25 comprises a locking collar 90 which is provided with an octagonal circumferential contour 91. Located on the locking collar 90 is a threaded collar 92, the bore wall of which is provided with a spindle nut thread 93 corresponding to the thread of the lifting spindle 20. On the circumference of the threaded collar 92, radially outward extending support ribs 94, 95, 96, and 97 are provided, which, among other things, provide for a safe mechanical connection of the threaded collar 92 to the locking collar 90.

As is apparent in particular from FIG. 6, the locking collar 90 is formed as an octagon-contour with guide rims 98, 99, 100, and 101 which are arranged opposing one another in pairs and which are spaced apart from one another, in each case corresponding to the inner dimension i of the support tube 12, formed here as a square tube. Hence, the guide rims 98 to 101, during the insertion of the spindle nut 25 from above into the support tube 12 in the assembly rotational angle position of the spindle nut 25, provide for a radial guidance during the execution of the movement path v to bring the spindle nut 25 from an upper front end 102 of the support tube 12 into its axial locking position V in which the locking collar 90 is located in a common plane with locking recesses 103, 104, 105, and 106, which are formed in the tube wall of the support tube 12.

As FIG. 6 further shows, the locking collar 90 comprises flattened corners for forming four locking rims 107, 108, 109, and 110 which are also arranged opposing one another in pairs. The locking rims 107 to 110 each run transversely to an associated support rib 94 to 97 and form together with the same one locking shoulder 111, respectively.

From an overview of FIGS. 7 and 8, it is apparent that after transferring the spindle nut 25 from the assembly rotational angle position illustrated in FIGS. 5 and 6 into the locking position illustrated in FIGS. 7 and 8, an engagement of the locking rims 107 to 110 with the locking recesses 103 to 106 takes place in such a manner that the locking shoulders 111, which have a L-shaped profile and which are each formed by the locking rims 107 to 110 and the support ribs 94 to 97, respectively, at least partly engage in the locking recesses 103 to 106, and rest at least partly on the inner side of the tube wall of the support tube 12. Hereby, on the one hand, the desired locking effect is achieved, and on the other hand, by means of the locking, a centering of the spindle nut 25 within the support tube 12 takes place so that a substantially coaxial alignment of a spindle nut axis 112 with the longitudinal axis 21 of support tube 12 is the result.

When, as shown in FIG. 8, the support tube 12 together with the spindle nut 25, which is in the locking position, is inserted into the shank tube 11 for the assembly of the lifting device 10, due to the tightly enclosing arrangement of the tube wall of the shank tube 11 on all sides, a rotation prevention is achieved which prevents an undesired rotation of the spindle nut 25 out of the locking position. Of course, if necessary, for securing the locking position independently from the enclosing arrangement of the shank tube 11, a separate locking element can be used, such as the spring pin 113 shown in FIGS. 7 and 8.

As is shown in particular in FIGS. 5 and 7, in the case of the present exemplary embodiment, the threaded collar 92 of the spindle nut 25 is provided with a trough-shaped recess 114 which is located on the upper rim of the threaded collar and which can be used for receiving a lubricant reservoir.

The invention claimed is:

1. A lifting device, in particular a semitrailer support, comprising a shank tube and a support tube which is movable with respect to the shank tube, wherein on the shank tube, a lifting gear mechanism is arranged which comprises an input shaft arrangement for connecting a drive device and an output shaft arrangement for driving a lifting spindle which is arranged within the support tube and which rests with one end on a pressure plate arranged within the shank tube and interacts with the moving end with a spindle nut arranged in the support tube, characterized in that the spindle nut located completely within the support tube, the spindle nut comprises a locking collar with at least two locking devices which interact with locking latches formed on the tube wall of the support tube in such a manner that, with a coaxial alignment of the spindle nut with the support tube, the spindle nut can be inserted, in an assembly rotational angle position, into the support tube and can be moved by rotating the spindle nut coaxially around a longitudinal axis of the support tube into a locking position, in which the locking devices get into engagement with the locking latches.

2. The lifting device according to claim 1, wherein the locking collar comprises a circumferential contour with four guide rims, which are each arranged opposing one another in pairs and which are spaced apart from one another corresponding to the inner dimension of the support tube formed as a square tube, and with four locking rims formed in the corner regions of the locking collar, and that the locking latches are formed by slotted recesses in opposing tube wall sections of the support tube.

3. The lifting device according to claim 2, wherein the circumferential contour of the locking collar is formed as an octagon-contour in such a manner that the locking rims are formed by flattened corners of the locking collar.

4. The lifting device according to claim 1, wherein for formation of a nut thread, a threaded collar with an internal thread is arranged on the locking collar.

5. The lifting device according to claim 4, wherein the threaded collar is provided on the locking collar's outer circumference with four support ribs which are arranged opposing one another in pairs and which extend radially to locking rims.

6. The lifting device according to claim 5, wherein the threaded collar is provided with a trough-shaped recess on the threaded collar's upper rim.

* * * * *